US005606437A

United States Patent [19]

Mosier

[11] Patent Number: 5,606,437
[45] Date of Patent: Feb. 25, 1997

[54] DIRECT DRIVE SPLIT PIXEL STRUCTURE FOR ACTIVE MATRIX LIQUID CRYSTAL DISPLAYS

[75] Inventor: Donald E. Mosier, Cedar Rapids, Iowa

[73] Assignee: Rockwell International, Seal Beach, Calif.

[21] Appl. No.: 414,894

[22] Filed: Mar. 31, 1995

[51] Int. Cl.$^6$ .................................................. G02F 1/1335
[52] U.S. Cl. .......................................... 349/106; 349/144
[58] Field of Search ............................ 359/54, 56, 59, 359/68, 87; 345/103, 149, 89, 92

[56] References Cited

U.S. PATENT DOCUMENTS

| Re. 33,882 | 4/1992 | Morozumi | 359/54 |
|---|---|---|---|
| 4,781,438 | 11/1988 | Noguchi | 350/339 |
| 4,834,505 | 5/1989 | Migliorato et al. | 350/333 |
| 4,840,460 | 9/1989 | Bernot et al. | 350/333 |
| 4,965,565 | 10/1990 | Noguchi | 340/784 |
| 4,969,718 | 11/1990 | Noguchi et al. | 350/339 |
| 5,121,235 | 6/1992 | Matino et al. | 359/54 |
| 5,132,820 | 7/1992 | Someya et al. | 359/59 |
| 5,142,392 | 8/1992 | Ueki et al. | 359/67 |
| 5,144,288 | 9/1992 | Hamada et al. | 340/702 |
| 5,150,240 | 9/1992 | Kim | 359/87 |
| 5,168,074 | 12/1992 | Sarma | 437/51 |
| 5,191,452 | 3/1993 | Sarma | 359/59 |
| 5,235,447 | 8/1993 | Hepp et al. | 359/54 |
| 5,235,448 | 8/1993 | Suzuki et al. | 359/59 |
| 5,245,450 | 9/1993 | Ukai et al. | 359/59 |

Primary Examiner—William L. Sikes
Assistant Examiner—James A. Dudek
Attorney, Agent, or Firm—Gregory G. Williams; M. Lee Murrah; George A. Montanye

[57] ABSTRACT

A wide viewing angle liquid crystal display and method of operating the same are disclosed. Each of a plurality of pixel elements of the display have individually driveable first and second pixel sub-elements. A desired average gray scale intensity for a first pixel element is determined. First and second drive voltages are determined as a function of the desired average gray scale intensity for the first pixel element. The first drive voltage is provided to the first pixel sub-element to drive it to a first gray scale intensity. The second drive voltage is provided to the second pixel sub-element to drive it to a second gray scale intensity. The average gray scale intensity for the first pixel element, which is a function of the first and second gray scale intensities, has reduced viewing angle dependence.

16 Claims, 2 Drawing Sheets

DIRECT DRIVE SPLIT PIXEL STRUCTURE FOR ACTIVE MATRIX LIQUID CRYSTAL DISPLAYS

BACKGROUND OF THE INVENTION

The present invention relates generally to liquid crystal displays (LCDs), and more particularly to active matrix liquid crystal displays (AMLCDs) having gray scale with an improved viewing angle.

AMLCDs are devices well known in the art for their utility in visually displaying data and images in a variety of applications such as in aviation cockpits. However, a significant problem with AMLCDs has been the difficulty in achieving gray scale with adequate viewing angle. This is due to the fact that the brightness versus drive voltage (BV) curves for AMLCDs vary significantly as a function of viewing angle.

One way to achieve gray scale in an AMLCD is to drive individual pixel elements at a number of discrete drive voltages to achieve discrete output intensities or brightness values. Pixel elements in AMLCDs do not actually generate light, but rather, act as light valves in the sense that the transmittance of a particular pixel element changes as the corresponding drive voltage is increased or decreased. For purposes of this application, pixel element "output intensities" or "brightness values" are phrases intended to mean the apparent intensity of a pixel element resulting from back-lighting and the pixel element's transmittance. Also for purposes of this application, it should be understood that references to a pixel element having a particular color are actually referring to the pixel element's apparent color resulting from an illuminating output intensity and the presence of a color filter associated with the pixel element. Finally, for purposes of this application a "pixel" is defined to be a physical region on the display which includes one red pixel element, one green pixel element, and one blue pixel element in close proximity to one another and generally being controlled at least somewhat independently of one another. The combination of output intensities of the three different colored pixel elements in each pixel are optically blended by the eye of the viewer to create the appearance that the pixel has a single color and intensity. Each of the pixel elements may in turn be divided into separate pixel sub-elements having the same color and generally occupying the same physical space as the pixel element.

Generally, the discrete drive voltages will include a threshold voltage $V_T$ below which the particular individual pixel element is not illuminated (has no output intensity), a saturation voltage $V_S$ at and above which the maximum output intensity for the pixel element is substantially achieved, and a number of discrete voltage levels between $V_T$ and $V_S$. Each of the discrete voltage levels between $V_T$ and $V_S$ corresponds to a particular output intensity, for the pixel element, between the non-illuminated state and the maximum output intensity.

In AMLCDs, the non-illuminated and the maximum output intensity states are relatively viewing angle independent when compared to the intermediate output intensity levels. However, the intermediate drive voltages result in output intensities which are heavily dependent on viewing angle. The result is poor gray scale performance of the AMLCD at wide viewing angles.

One method of improving gray scale performance in AMLCDs is disclosed in U.S. Pat. No. 4,840,460 to Bernot et al, which is assigned to Honeywell Inc. The Bernot et al patent describes a method of providing half-tone gray scale over wide viewing angles in which each pixel element of the display is subdivided into a plurality of pixel sub-elements all having the same color. Each of the pixel sub-elements, which has an effective capacitance, is connected in series with a separate control capacitor. Each pixel sub-element/control capacitor combination is connected in parallel with the other pixel sub-element/control capacitor combinations to form a single pixel element. In the disclosed preferred embodiments, the capacitance characteristics of the various pixel sub-elements and control capacitors are chosen so that a different drive voltage is necessary to "turn on" each pixel sub-element.

As one pixel sub-element is about to enter an optical saturation state in response to an increasing drive voltage, the next pixel sub-element is near its threshold of optical activity. As the drive voltage is increased, the number of pixel sub-elements in the saturation state increases, but no more than one pixel sub-element is driven between the threshold and saturation states at any one time. As a result, no more than one pixel sub-element will have appreciable angular dependence at any one time, and the average gray scale performance of the pixel element as a whole will be largely viewing angle independent.

While methods such as the one disclosed in Bernot et al can be used to produce an AMLCD having improved gray scale performance over wider viewing angles, they do have several disadvantages. For example, these techniques increase total drive voltage requirements and have a negative impact on yield since adjacent elements in the LCD matrix must have different properties. The maximum drive voltage applied to the first pixel sub-element of each pixel will have to be considerably higher than $V_S$ in order to achieve optical saturation in the other pixel sub-elements

SUMMARY OF THE INVENTION

It is an object of the present invention to provide an LCD with improved gray scale over a wide range of viewing angles. It is a second object of the present invention to provide improved gray scale output while minimizing drive voltage requirements. It is a third object of the present invention to provide an LCD panel having improved manufacturability. It is a fourth object of the present invention to provide an LCD panel with a simplified control means.

The present invention includes a wide viewing angle liquid crystal display and method of operating the same. Each of a plurality of pixel elements of the display have individually driveable first and second pixel sub-elements. A desired average gray scale intensity for a first pixel element is determined. First and second drive voltages are determined as a function of the desired average gray scale intensity for the first pixel element. The first drive voltage is provided to the first pixel sub-element to drive it to a first gray scale intensity. The second drive voltage is provided to the second pixel sub-element to drive it to a second gray scale intensity. The average gray scale intensity for the first pixel element, which is a function of the first and second gray scale intensities, has reduced viewing angle dependence.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE PREFERRED EMBODIMENTS

The present invention is an active matrix liquid crystal display structure, interconnect scheme and methods of use which allow separate control of each of two portions of every display element, while maintaining the effect of a brickwall color pattern. At the same time, the invention allows currently developed control circuits to drive the new panel of the present invention. The display structure, interconnect scheme and drive methods provide numerous advantages over the prior art which will be apparent from this disclosure.

This application provides a detailed disclosure of the display structure, interconnect scheme and drive methods of the present invention. The application does not discuss in as great of detail possible methods of fabrication of the novel display structure. Methods of fabrication of display structures are well known in the art. Those skilled in the art will, with the benefit of this disclosure, be able to readily implement and practice the invention. Numerous other patents and technical sources describe methods of fabricating display structures which can be adapted to produce the display structure of the present invention. The following patents disclose methods of fabricating display panels and are herein incorporated by reference: U.S. Pat. Nos. 4,781,438 to Noguchi; 4,834,505 to Migliorato et al.; 4,840,460 to Bernot et al.; 4,965,565 to Noguchi; 5,132,820 to Someya et al; 5,142,392 to Ueki et al; 5,144,288 to Hamada et al; and 5,191,452 to Sarma.

Figure 1:
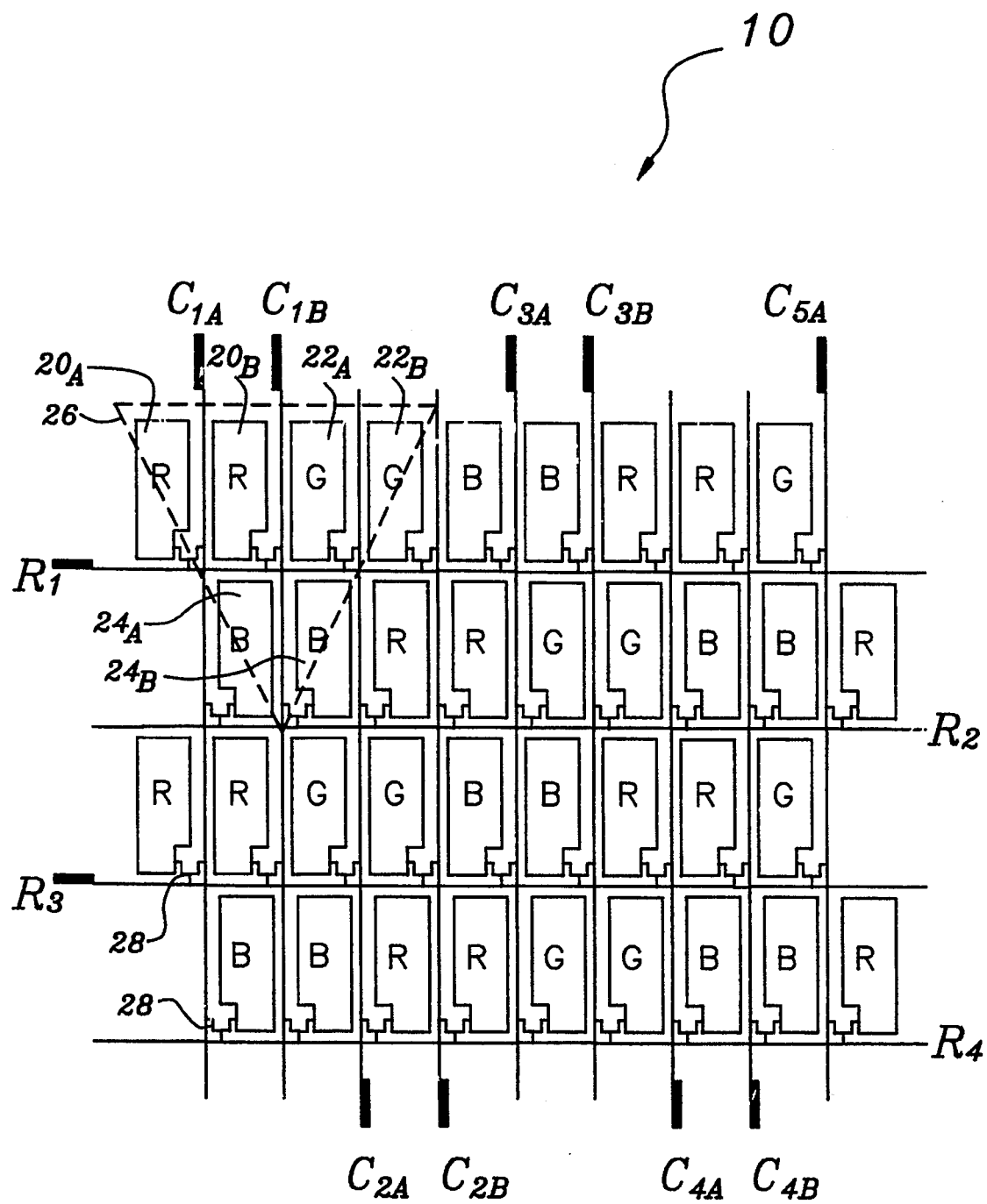
FIG. 1 is a diagrammatic view illustrating an LCD panel having a pixel sub-element matrix and column and row conductor configuration in accordance with the present invention.

FIG. 1 is a diagrammatic view illustrating an LCD panel configuration in accordance with preferred embodiments of the present invention. Panel 10 includes a matrix of pixel elements, row conductors $R_1$ through $R_N$ (only $R_1$ through $R_4$ are shown), and pairs of column conductors $C_1$ through $C_M$ (only pairs $C_1$ through $C_5$ are shown). Each of the pairs of column conductors includes two neighboring or consecutive column conductors (for instance, conductor $C_1$ includes $C_{1A}$ and $C_{1B}$) which are preferably substantially straight and oriented parallel to one another and to other column conductors. In preferred embodiments, the column conductors are oriented substantially perpendicular to the row conductors.

In the configuration of the embodiment shown in FIG. 1, the odd numbered pairs of column conductors are connected to an external drive circuit (not shown) from the top of panel 10, while the even numbered pairs are driven from the bottom of the panel. Likewise, odd and even numbered row conductors are coupled to external circuitry (not shown) from opposite sides of panel 10. This configuration is advantageous in that it reduces interconnect density. However, it is clear that in other embodiments of the present invention the odd and even numbered columns can have connections on the same side of the panel, and that the odd and even numbered row conductors can be connected from the same side of the panel.

The matrix of pixel elements includes red pixel elements 20, green pixel elements 22 and blue pixel elements 24 arranged in rows having a repeating pattern of one red pixel element, one green pixel element and one blue pixel element. Each pixel element is divided into at least two consecutive or adjacent pixel sub-elements having the same color as the pixel element. For example, each red pixel element includes two red pixel sub-elements $20_A$ and $20_B$. Therefore, the rows of pixel elements form a repeating pattern of, for example, two red pixel sub-elements $20_A$ and $20_B$, two green pixel sub-elements $22_A$ and $22_B$, and two blue pixel sub-elements $24_A$ and $24_B$. The configuration of adjacent pixel sub-elements having the same color (i e., being built with the same color filter) helps to achieve an identical color distribution as in a standard brickwall panel. As in a traditional brickwall display structure, the pattern of pixel elements in adjacent rows are offset from one another so that individual pixels 26 include one each of the three colors of pixel elements. Note that the pixel 26 includes all of the area occupied by pixel elements 20, 22 and 24, and not just the area inside of the represented triangle.

In preferred embodiments, the density of column conductors is essentially double that of row conductors in order to accommodate the doubling of display resolution in terms of the number of pixel sub-elements per row. The increase in resolution, from 0.15 mm to 0.075 mm for typical avionics grade panels, is within the assembly limits currently used in the manufacture of commercial VGA panels. In other embodiments, the number of column conductors is three or more times the density of row conductors.

These other embodiments are necessary to accommodate alternative display panel embodiments according to the present invention in which the number of pixel sub-elements per pixel element is three or more.

Each pixel sub-element is coupled through a thin film transistor (TFT) 28 to one row conductor and one column conductor. TFTs 28 each have one electrode coupled to a pixel sub-element, one electrode coupled to a column conductor, and a control electrode coupled to a row conductor. All of the pixel sub-elements in a particular row are coupled to the same row conductor. Each pixel sub-element in a particular row is coupled to a separate one of the column conductors. This allows independent control of each of the pixel sub-elements within each pixel element. Note that if the pairs of column conductors (i e., $Cl_A$ and $Cl_B$) were electrically connected, the panel would look electrically identical to conventional brickwall display structures. However, in preferred embodiments, the pairs of column conductors are not electrically connected so that individual and separate control of each pixel sub-element is possible.

The column conductors are made straight, without the offsets normally required for brickwall display element configurations. Instead, the TFT connections to pixel sub-elements alternate from left of the conductor to right of the conductor, as shown in FIG. 1. The straight column conductors provide improved aperture ratio and shorter column length, thus improving column impedance.

In preferred embodiments of the present invention, the array of column and row conductors is used to supply individually selected drive voltages to each sub-element of each pixel element. If the drive voltages are correctly chosen, the average viewing angle characteristics of two pixel sub-elements, each driven with a different one of the voltages, is superior to that of any single pixel element driven with a single drive voltage having a value between $V_T$ and $V_S$. A very simple example, for a particular pixel element, is to drive a first pixel sub-element to 100 percent optical intensity while leaving the other pixel sub-element black. In some preferred embodiments this is done by driving the first pixel sub-element to or slightly above the saturation voltage $V_S$ while driving the other pixel sub-element with a voltage below the threshold voltage $V_T$. The average optical result for the pixel element as a whole is 50% brightness. However, the viewing angle dependence is greatly improved since each of the pixel sub-elements is driven at one of the essentially non-viewing angle dependent intensities.

If all of the individual pixel sub-elements are driveable with selectable voltages to a number of distinct gray scale intensities, numerous voltage combinations are possible to provide complimentary angular characteristics for different average optical levels desired. Each average optical gray scale level should be obtainable with at least one of the pixel sub-elements driven to an optical intensity which is essentially non-viewing angle dependent. For example, if each of two pixel sub-elements is individually driveable to one of four gray scale levels, seven average gray scale levels for the pixel element can be achieved. All seven can be achieved with at least one of the two pixel sub-elements driven to an intensity which is essentially viewing angle independent, thus improving the viewing angle performance for the pixel element as a whole.

Since the panel structure of the present invention provides two individually controllable sub-elements in the same space as a single element would have occupied, the two drive voltages can be applied to each pixel element in such a way that, to the viewer, the averaged optical results provide the appearance that the pixel elements are non-divided and are providing superior gray level performance as a whole. Further, the two drive voltages can be alternated at a rate at which the LC material can respond to more completely average the optical output. For example, a first voltage can be applied to a particular first pixel sub-element $20_A$ to obtain a first gray scale output intensity, while a second voltage is applied to the corresponding adjacent second sub-element $20_B$ to obtain a second gray scale output intensity. As discussed above, the average output intensity for the pixel element as a whole at any one time will be an average of the first and second gray scale output intensities. However, by alternating the drive voltages over time so that the first drive voltage is periodically applied to sub-element $20_B$ while the second drive voltage is applied to sub-element $20_A$, the average output intensity over time for the individual pixel sub-elements themselves will equal the desired output intensity.

Figure 2:
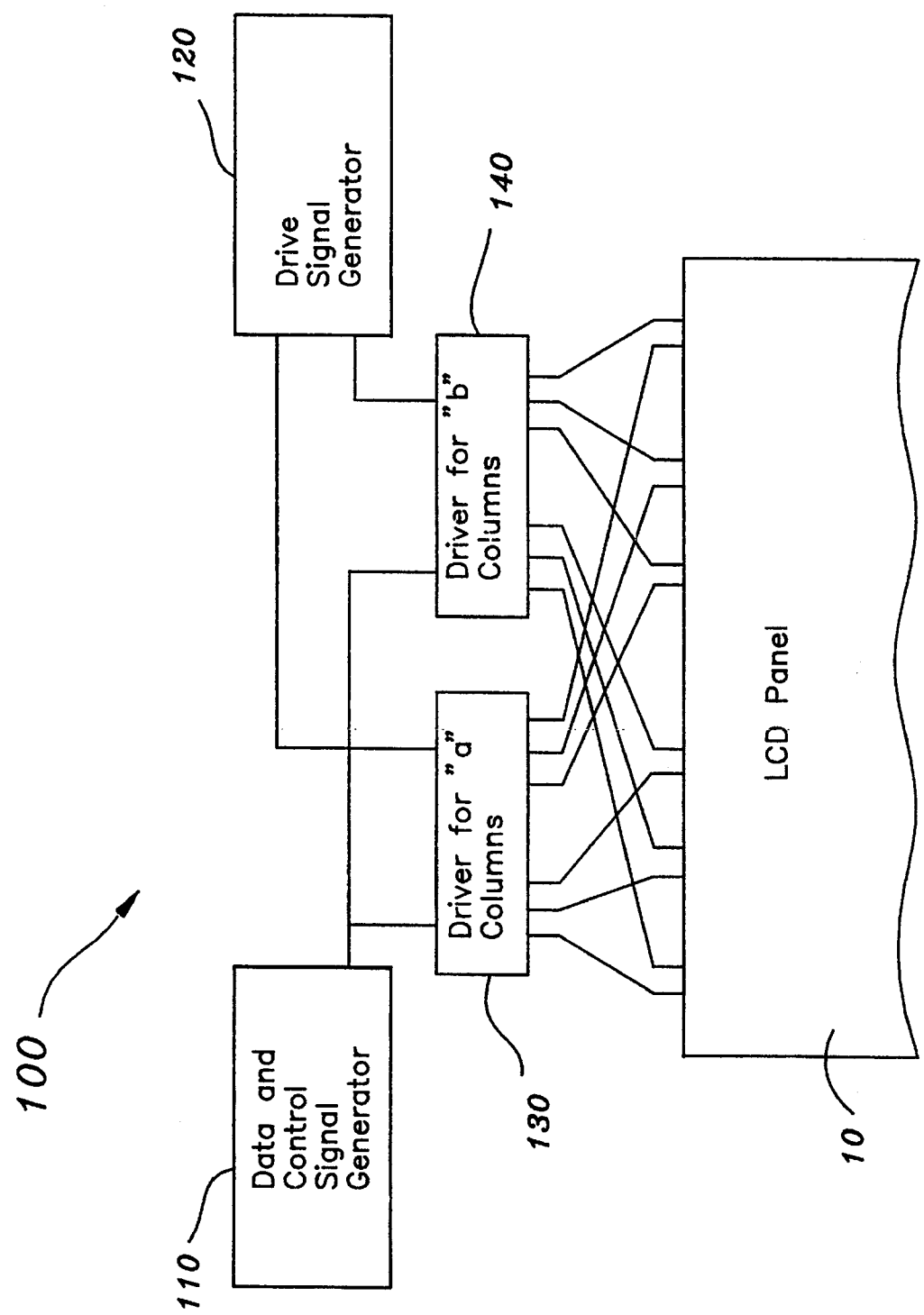
FIG. 2 is a block diagram illustrating a drive system for driving the LCD panel shown in FIG. 1 to achieve greatly improved gray scale performance.

FIG. 2 is a block diagram illustrating a drive system for driving LCD panel 10 shown in FIG. 1 to achieve greatly improved gray scale performance over wide viewing angles. Drive system 100 produces drive voltages which drive the pixel sub-elements of panel 10 to produce gray scale output for the panel over wide viewing angles. Drive system 100 includes data and control signal generator 110, drive signal generator 120, driver 130 and driver 140.

Control signal generator 110 generates data and control signals and provides the signals as inputs to drivers 130 and 140. Control signal generator 110 is a digital controller which generates data and control signals for controlling displayed information and gray scale in panel 10. Generator 110 is coupled to each of drivers 130 and 140 such that control and data signals generated and/or transmitted by generator 110 are supplied identically to each of drivers 130 and 140.

Drive signal generator 120 is coupled to each of drivers 130 and 140 and generates drive signals which act as inputs to the drivers. In preferred embodiments, drive signal generator 120 generates two separate sets of analog drive signals, with a separate one of the two sets of drive signals being supplied to each of drivers 130 and 140. Drivers 130 and 140 are preferably identical to one another and are of the type which generate gray scale drive voltages of varying predetermined magnitudes in response to data and control signals from generator 110 and to drive signals from generator 120.

Driver 130 is coupled to every other column conductor (subset "a" including, conductors $C_{1A}, C_{2A}, \ldots C_{MA}$) to drive the pixel sub-elements in these columns. Likewise, driver 140 is coupled to the remaining column conductors (i e., subset "b" including $C_{1B} \ldots C_{NB}$) to drive the pixel sub-elements in these columns. Note that the two driver configuration shown in FIG. 2 is only one of multiple possible configurations and is chosen for its ease of illustration. In some preferred embodiments such as the one illustrated in FIG. 1, four separate column drivers can be used, two for driving odd numbered pairs of column conductors from the top of the panel and two for driving even numbered pairs of column conductors from the bottom of the panel. In other words, if the connections for the column conductors alternate from top to bottom to reduce interconnect density, additional drivers can be used to facilitate this configuration. Also, it is clear that the method of the present invention is extendible to panels requiring additional drivers merely by substituting on a two for one basis, with properly interleaved interconnections. Further, embodiments in which each pixel element is divided into more than two pixel sub-elements will require a corresponding increase in the number of column conductors and drivers.

The configurations of panel 10 and drive system 100 make it possible to interconnect panel 10 such that, to the graphics system driving the panel and to the digital control system transmitting data to the panel, the new panel structure appears functionally identical or similar to previous panel configurations in which pixel elements were not divided into pixel sub-elements. Drivers 130 and 140 are controlled identically and are sent the same data for gray scale control. However, the analog inputs to the drivers from drive signal generator 120 are different, effecting different selections of gray scale drive voltages between the two drivers, even for the same digital data. Thus, the entire digital control section of the unit containing the modified display panel need not be changed. The panel provides a simple upgrade path to enhanced gray scale performance.

The present invention provides numerous advantages over the prior art. Improved wide viewing angle gray scale performance is achieved as compared to conventional panels having non-divided pixel elements. Also, the present invention provides advantages over prior art panels having subdivided pixel elements because the pixel sub-elements of the present invention can be driven individually. Thus, high drive voltages are no longer needed because the voltage input to one pixel sub-element is not obtained by voltage division of the input to another pixel sub-element.

While particular embodiments of the present invention have been shown and described, it should be clear that changes and modifications may be made to such embodiments without departing from the true scope and spirit of the invention. For example, the invention was described with respect to a normally black AMLCD in which a drive voltage below $V_T$ will result in a near minimum output intensity and a voltage above $V_S$ will result in a near maximum output intensity. However, the invention will work equally well with a normally white AMLCD as well.

Additionally, the pixel sub-elements in a given pixel element need not be identical in size. Making them differ in size can aid in determination of appropriate gray level voltage pairs. It is intended that the appended claims cover all such changes and modifications.

I claim:

1. A wide viewing angle liquid crystal display comprising:

a plurality of first conductors oriented in a first direction;

a plurality of second conductors oriented substantially parallel to the first direction;

a plurality of third conductors oriented in a second direction substantially perpendicular to the first direction; and a plurality of pixel elements, each pixel element comprising:

a first pixel sub-element having a color associated therewith, the first pixel sub-element being coupled to one of the plurality of first conductors and to one of the plurality of third conductors, wherein the one of the plurality of first conductors and the one of the plurality of third conductors are used to drive the first pixel sub-element with a first drive voltage to a first gray scale intensity;

a second pixel sub-element having the color associated therewith, the second pixel sub-element being positioned adjacent to the first pixel sub-element, the second pixel sub-element being coupled to one of the plurality of second conductors and to the one of the plurality of third conductors, wherein the one of the plurality of second conductors and the one of the plurality of third conductors are used to drive the second pixel sub-element with a second drive voltage generated separately from the first drive voltage to a second gray scale intensity independent of the first gray scale intensity, each pixel element having an average gray scale intensity which is a function of gray scale intensities of the first and second pixel sub-elements; and the first drive voltage is any of a plurality of selectable drive voltages corresponding to a plurality of selectable gray scale intensities.

2. The wide viewing angle liquid crystal display of claim 1 wherein the second drive voltage is any of the plurality of selectable drive voltages corresponding to the plurality of selectable gray scale intensities.

3. The liquid crystal display of claim 1 wherein the one of the plurality of first conductors is coupled to the first pixel sub-element but not to the second pixel sub-element, and wherein the one of the plurality of second conductors is coupled to the second pixel sub-element but not to the first pixel sub-element so that the first and second pixel sub-elements can be driven to selected gray scale intensities independently of one another.

4. The liquid crystal display of claim 3 wherein the first pixel sub-element is coupled to the one of the plurality of first conductors and to the one of the plurality of third conductors through a first thin film transistor, and wherein the second pixel sub-element is coupled to the one of the plurality of second conductors and to the one of the plurality of third conductors through a second thin film transistor.

5. The liquid crystal display of claim 4 wherein the plurality of first conductors and the plurality of second conductors are column conductors and wherein the plurality of third conductors are row conductors, the liquid crystal display having approximately twice as many column conductors as row conductors.

6. The liquid crystal display of claim 5 wherein the column conductors are substantially straight conductors which extend substantially parallel to one another.

7. The liquid crystal display of claim 6 wherein the plurality of pixel elements form a brickwall structure having rows of pixel elements, pixel elements in each row having a repeating pattern of colors associated therewith, the repeating pattern of colors in each row being offset from the repeating pattern of colors in adjacent rows such that each column conductors is coupled to a plurality of pixel sub-elements having a first color and being positioned on a first side of the column conductor, and is coupled to a plurality of pixel sub-elements having a second color and being positioned on a second side of the column conductor.

8. The liquid crystal display of claim 1 wherein the first gray scale intensity is essentially uniform over a wide range of viewing angles.

9. The liquid crystal display of claim 1 wherein the one of the plurality of first conductors and the one of the plurality of third conductors are used to periodically drive the first pixel sub-element with the second drive voltage to the second gray scale intensity while the one of the plurality of second conductors and the one of the plurality of third conductors are used to periodically drive the second pixel sub-element with the first drive voltage to the first gray scale intensity.

10. A method of achieving gray scale in a liquid crystal display over wide viewing angles, the liquid crystal display having a plurality of pixel elements, each of the plurality of pixel elements having first and second individually driveable adjacent sub-elements, an average gray scale intensity of each particular pixel element being a function of gray scale intensities of the particular pixel element's first and second adjacent sub-elements, the method comprising:

determining a desired average gray scale intensity for a first pixel element having a first color associated therewith;

determining a first drive voltage as a function of the desired average gray scale intensity for the first pixel element, the first drive voltage is any of a plurality of selectable drive voltages corresponding to a plurality of selectable gray scale intensities;

determining a second drive voltage as a function of the desired average gray scale intensity for the first pixel element;

providing the first drive voltage to a first sub-element of the first pixel element in order to drive the first sub-element to a first fray scale intensity, the first sub-element having the first color associated therewith; and providing the second drive voltage to a second sub-element of the first pixel element in order to drive the second sub-element to a second gray scale intensity, the second sub-element having the first color associated therewith, the first and second gray scale intensities being selected such that an average gray scale intensity of the first pixel element is approximately equal to the desired average gray scale intensity.

11. The method of claim 10 wherein the first drive voltage is below a threshold voltage such that the first gray scale intensity is substantially viewing angle independent so that a viewing angle dependence of the first pixel element having the desired average gray scale intensity is minimized.

12. The method of claim 10 wherein the first drive voltage is above a saturation voltage such that the first gray scale intensity is substantially viewing angle independent so that a viewing angle dependence of the first pixel element having the desired average gray scale intensity is minimized.

13. The method of claim 12 wherein a voltage value of the second drive voltage can be increased without substantially increasing the first drive voltage above the saturation voltage.

14. The method of claim 10 wherein the first drive voltage has a voltage value which results in the first pixel sub-element having the first gray scale intensity and being substantially viewing angle independent so that a viewing angle dependence of the first pixel element having the desired average gray scale intensity is minimized.

15. A method of achieving gray scale in a liquid crystal display over wide viewing angles, the liquid crystal display having a plurality of pixel elements, each of the plurality of pixel elements having first and second individually driveable adjacent sub-elements, an average gray scale intensity of each particular pixel element being a function of gray scale intensities of the particular pixel element's first and second adjacent sub-elements the method comprising:

determining a desired average gray scale intensity for a first pixel element having a first color associated therewith:

determining a first drive voltage as a function of the desired average gray stale intensity for the first pixel element:

determining a second drive voltage as a function of the desired average gray scale intensity for the first pixel element:

providing the first drive voltage to a first sub-element of the first pixel element in order to drive the first sub-element to a first gray scale intensity, the first sub-element having the first color associated therewith: and providing the second drive voltage to a second sub-element of the first pixel element in order to drive the second sub-element to a second gray scale intensity, the second sub-element having the first color associated therewith, the first and second gray scale intensities being selected such that an average gray scale intensity of the first pixel element is approximately equal to the desired average gray scale intensity;

periodically reversing the first and second gray scale intensities by providing the first drive voltage to the second sub-element of the first pixel element in order to drive the second sub-element to the first gray scale intensity, and by providing the second drive voltage to the first sub-element of the first pixel element in order to drive the first sub-element to the second gray scale intensity, wherein periodically reversing the first and second gray scale intensities results in a time averaged gray scale intensity for each of the first and second sub-elements which is approximately equal to the desired average gray scale intensity for the first pixel element.

16. A wide viewing angle liquid crystal display comprising:

a first pixel element having a first color associated therewith, the first pixel element comprising:

a first pixel sub-element having the first color associated therewith; and a second pixel sub-element adjacent the first pixel sub-element and having the first color associated therewith;

means for driving the first pixel sub-element at a first drive voltage to obtain a first gray scale intensity from the first pixel sub-element;

means for driving the second pixel sub-element at a second drive voltage to obtain a second gray scale intensity from the second pixel sub-element, an average gray scale intensity of the first pixel element being a function of the first and second gray scale intensities, wherein a value of the second drive voltage is selectively chosen independent of a value of the first drive voltage is the first drive voltage is chosen such that the first sub-element having the first gray scale intensity is substantially viewing angle independent:

the second drive voltage is chosen such that the second sub-element having the second gray scale intensity is substantially viewing angle independent:

the second drive voltage is substantially equal to the first drive voltage and the second gray scale intensity is substantially equal to the first gray scale intensity.

* * * * *